United States Patent Office 3,557,404
Patented Jan. 26, 1971

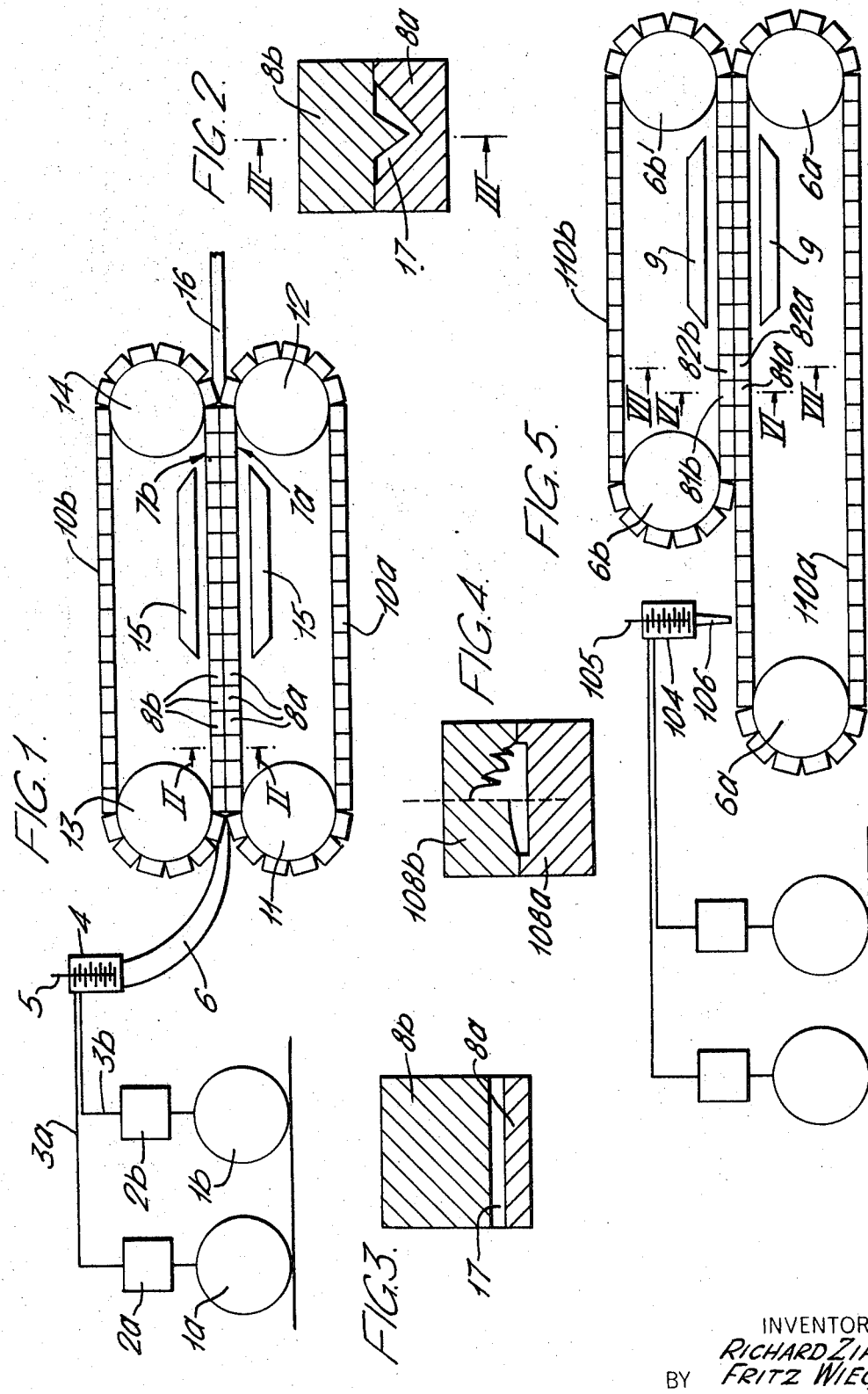

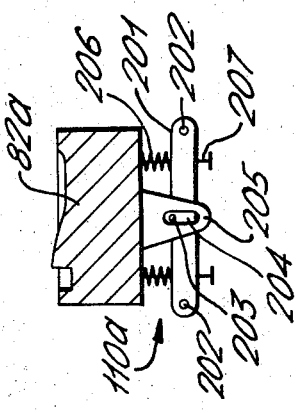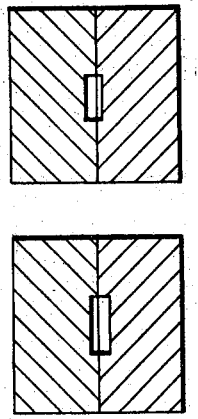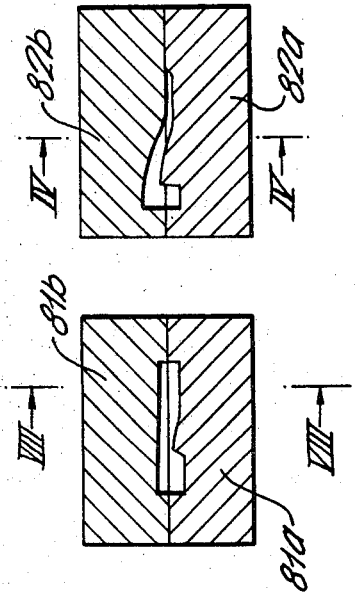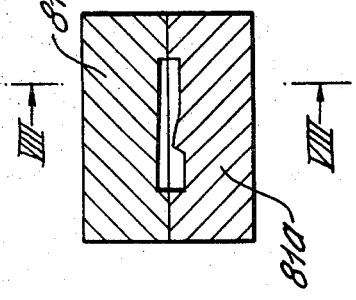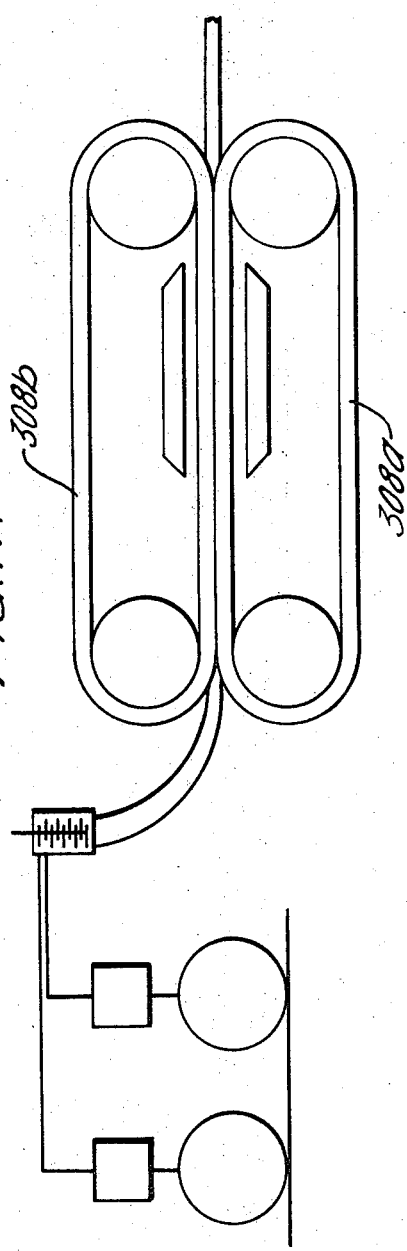

3,557,404
ARRANGEMENTS FOR THE CONTINUOUS MANU-FACTURE OF MOULDED ARTICLES
Richard Zippel and Fritz Wiegert, Eschwege, Germany, assignors to Richard Zippel & Co. KG., Eschwege, Germany, a company of Germany
Filed Aug. 12, 1968, Ser. No. 752,020
Claims priority, application Germany, Aug. 26, 1967, 1,704,415
Int. Cl. B29c 1/16
U.S. Cl. 18—4          4 Claims

ABSTRACT OF THE DISCLOSURE

Arrangements are disclosed for the continuous manufacture of molded articles from synthetic plastic materials which comprise two conveyors each having an upper and a lower run, the upper run of one conveyor being immediately adjacent the lower run of the other conveyor. Each conveyor carries one or more mould parts which form one or more moulds while travelling along the immediately adjacent runs, means being provided for feeding plastics materials from a mixing chamber to the mould parts.

BACKGROUND OF THE INVENTION

The invention relates to arrangements for the continuous manufacture of moulded articles from synthetic plastic materials which are mixed in mixing chambers and fed continuously or intermittently therefrom to moulds.

Up to now, moulded parts from liquid multi-component plastic materials could only be manufactured in short lengths, since closed moulds are required for the production, and since such moulds cannot be produced to any lengths. It is known to arrange the moulds on a conveyor belt or on a turntable and to connect the top and bottom parts of the moulds by hinges. In this way, a large number of moulded articles can be produced in series production comparatively quickly.

Hitherto, moulded articles of indefinite lengths could be produced from thermoplastic material only by means of extruding machines. In such extruding machines, granular material is liquified by heat and, for example by means of a rotating helix, is pressed through a nozzle which in its shape corresponds to the surface of the article to be moulded and which can be produced in any desired length. The thermoplastic material after having been pressed through the nozzle and shaped thereby, is cooled and, thus, profiled rods of any desired length may be produced. However, thermoplastic materials are not suitable for all purposes. Duroplastic materials which are made of liquid plastic synthetic materials after mixing have a range of characteristics which make them superior to thermoplastic materials. Up to now there is no possibility to produce profiled rods from those duroplastic materials.

Moreover, profiled rods made from thermoplastic materials by extrusion show the same profile over the whole length as they are pressed through a nozzle. It is not possible to produce in this manner a profiled rod from thermoplastic materials having a pattern on its surfaces.

It is an object of the invention to provide an arrangement for the manufacture of moulded articles of any desired length from liquid multi-component synthetic materials. Profiled rods manufactured on such an arrangement may have convex or concave patterns on, for example, two composite surfaces.

SUMMARY OF THE INVENTION

The invention consists in an arrangement for the continuous manufacture of moulded articles from synthetic plastic materials, comprising a first endless conveyor, a second endless conveyor, means for moving said first and second conveyors along two parallel adjacent paths, each of said first and second conveyors carrying at least one mould part arranged to form a mould while travelling with said first and second conveyors along said two parallel adjacent paths, a chamber for mixing synthetic plastic materials, and means for feeding the mixed synthetic plastic materials to said mould parts.

BRIEF DESCRIPTION OF THE DRAWINGS

To make the invention clearly understood reference will now be made to the accompanying drawings which are given by way of example and in which:

FIG. 1 illustrates a first embodiment of the invention for manufacturing an article of indefinite length;

FIG. 2 is a section through a mould along the line II—II of FIG. 1, on a larger scale;

FIG. 3 is a section along the line III—III of FIG. 2;

FIG. 4 is a section analogous to the section of FIG. 2 but of a modified mould;

FIG. 5 illustrates a second embodiment of the invention for manufacturing shoe soles of different shapes;

FIG. 6 is a section along the line VI—VI of FIG. 5, on a larger scale;

FIG. 7 is a section along the line VII—VII of FIG. 5, on a larger scale;

FIG. 8 is a section along the line VIII—VIII of FIG. 6;

FIG. 9 is a section alon gthe line IX—IX of FIG. 7;

FIG. 10 illustrates a detail of the embodiment of FIG. 5 on a larger scale and partly in section; and FIG. 11 illustrates a third embodiment of the invention.

DESCRIPTION OF THE PREFERRED EMBODIMENTS

In the embodiment of FIGS. 1, 2 and 3 two synthetic plastics materials are mixed together. The two materials are housed in two containers 1a and 1b, and are fed by pumps 2a and 2b through ducts 3a and 3b into a mixing chamber 4 having a stirrer 5. From the mixing chamber 4 the mixed plastic materials are fed into a mould through a nozzle 6. The feed of the material is achieved by the pressure of the plastic materials entering the mixing chamber 4. The mould consists of two halves, generally indicated by numerals 7a and 7b, namely a bottom half 7a and a top half 7b. The two halves 7a and 7b each comprise a number of smaller mould parts 8a and 8b. The mould parts 8a are in the bottom part 7a of the mould and the mould parts 8b are in the top part 7b of the mould. The mould parts 8a are carried by a bottom conveyor 10a which travels about wheels 11 and 12, one of which is driven in known manner by a drive not shown. The mould parts 8b are carried by a top conveyor 10b which travels about wheels 13 and 14 one of which is driven by the drive. Heating devices 15 are provided where the mould parts 8a and 8b are fitted together for accelerating hardening of the plastic materials. The manufactured profiled rod 16 of indefinite length leaves the arrangement at the end opposite to the nozzle 6. FIGS. 2 and 3 show a simple mould with a uniform profile over its entire length. As shown in FIG. 3, the mould cavity 17 is open at the leading and trailing ends of the mould parts 8a.

To produce moulded articles such as rods 10 of indefinite length all the mould parts 8a, 8b of one conveyor 10a or 10b show the same profile, and the mould cavities 17 at the ends of the mould parts in direction of travel are open. The nozzle 6 of the mixing chamber 5 extends into the mould formed between mould parts 8a of one conveyor 10a and the mould parts 8b of the other conveyor 10b. The outer shape of the end of the nozzle 6 corresponds to the shape of the mould cavity 17.

With the arrangement of FIGS. 1, 2 and 3, moulded articles of any desired length can be manufactured from duroplastic material. The nozzle 6 closes the trailing end of the mould formed by the mould parts 8a, 8b between the two conveyor 10a, 10b while the leading end of the mould is closed by hardened plastic material in the mould. The pressures are not very high, and may reach 3 atmospheres. As the plastic material is discharged continuously from the nozzle 6, it is possible to discharge it in such a way that it is not highly liquid but paste-like. This has the advantage that the material does not settle in the very small gaps between the individual mould parts. The moulded articles of any desired length can be produced with patterns on one or on two opposite surfaces of the moulded products. It is possible to furnish the base of each mould half with a pattern which is then transferred to the moulded article during the moulding process. The patterns can be of any shape, they can be convex as well as concave, which are repeated over the length of the conveyor runs. In this way it is possible to produce e.g. borders with convex relief ornaments. This has so far not been possible in the moulding technique of long rods from plastic synthetic materials.

FIG. 4 shows a more complicated mould formed by mould parts 108a and 108b with the same profile over its complete length in the bottom part 108a, while top part 108b shows a varying profile. This type of mould produces profiled rods with a pattern on one surface.

The embodiment of FIGS. 6, 7, 8 and 9 differs from the embodiment of FIGS. 1, 2 and 3 in that the bottom conveyor 110a is about twice as long as the top conveyor 110b and that a continuously dispensing mixing chamber 104 is provided above the bottom conveyor 110a in front of the top conveyor 110b. Mould parts 81a, 81b and 82a, 82b of different types are provided as is shown in FIGS. 6, 7, 8 and 9. The example shows the production of shoe soles of different shapes and sizes.

The embodiment of FIGS. 5, 6, 7 and 8 is suitable for mass production of moulded articles. It is economical especially when small moulded plastic articles are manufactured which are required in large numbers like shoe soles. In such a case it is advantageous for the bottom conveyor 110a to be longer than the top conveyor 110b, the nozzle 106 of an intermittent discharging mixing chamber 104 being fitted above the longer part of the bottom conveyor 110a, in front of the top conveyor 110b. A quick discharge of material into the individual moulds is facilitated. The molds are then closed automatically by the shorter conveyor 110b when corresponding bottom and top mould parts register with one another. The embodiment is partciularly suitable for the processing of foaming resins which in their liquid form immediately after the mixing of the individual components cover only a small volume which is greatly increased during the foaming process. The speeds of the conveyors and the discharges of the mixed resins can be synchronized such that foaming starts the moment each mould is closed.

For the mass production of moulded articles of varying shapes with the same arrangement it is useful when the bottom conveyor 110a accommodates twice or even more mould parts than the top conveyor, as then one half of the mould parts of the top conveyor closes alternatively one of two mould parts of the bottom conveyor. In this way it is possible to produce automatically different shapes of moulded articles by using a known equipment for controlling the quantities of plastic material leaving the mixing chamber 104. Advantageously a sorting mechanism of any suitable known construction is provided at the end of the production line where the moulds carried by both the conveyors are opened and the moulded articles ejected to guide different articles to different collecting containers.

FIG. 10 illustrates in greater detail how a mould part 82a is attached to the conveyor 110a. The attachment of the mould parts 82b, 81a, 81b, 8a and 8b to the respective conveyors is effected similarly.

As can be seen from FIG. 10, the conveyor 110a comprises bridge members 201 pivoted to chain members at pivot points 202. A pin 203 of each bridge member 201 engages displaceably in an elongated hole 204 of a bracket 205 carrying the mould part 82a which is resiliently held by springs 206 guided by pins 207.

FIG. 11 illustrates a further embodiment having two conveyors, each comprising a single mould part 308a and 308b respectively, each formed by an endless strap of flexible material. By using such moulding parts, preferably flat profiled rods can be manufactured. The mould parts 308a, 308b distort at the return regions of the conveyors. This is not a disadvantage, but on the contrary, it is an advantage for the ejection of the moulded rod 316, as the flexible mould parts can easily be separated from the profiled rod 316. These mould parts have the advantage that they enable smoothly profiled rods to be obtained. Various flexible materials are suitable for such endless mould parts, which should not be affected by liquid plastic material. They may for example be made of silicon rubber. The endless mould parts may be fitted to separate carriers, or they may serve as endless conveyors themselves.

We claim:

1. An arrangement for the continuous manufacture of moulded articles from synthetic plastics materials, comprising a first endless conveyor, a second endless conveyor, a first plurality of mould parts each individually resiliently mounted on said first conveyor, individually associated biasing means interposed between each of said first mould parts and said first conveyor, a second plurality of mould parts each individually resiliently mounted on said second conveyor, individually associated biasing means interposed between each of said second mould parts and said second conveyor, means for moving said first and second conveyors along two parallel adjacent paths, associated pairs of said first plurality of mould parts and said second plurality of mould parts being urged by their respective biasing means into abutting relationship while travelling with said first and second conveyors along said two parallel adjacent paths, a chamber for mixing synthetic plastics materials, and means for feeding the mixed synthetic plastics materials to said mould parts.

2. An arrangement as defined in claim 1, wherein each mould part of at least one of said first and second plurality of mould parts has a mould cavity open at its leading and trailing ends, said mould cavities being of equal shape, said feeding means comprising an outlet nozzle of an outer cross-sectional shape complementary to the cross-sectional shape of said mould cavities at their trailing ends for enabling said nozzle to enter successively said mould cavities at said trailing ends.

3. An arrangement as defined in claim 1, wherein said first plurality of mould parts and said second plurality of mould parts form a plurality of moulds, said first conveyor being longer than said second conveyor, said feeding means comprising an outlet nozzle arranged above said first conveyor in front of said second conveyor adapted to feed successively the plastics materials to said first plurality of mould parts.

4. An arrangement as defined in claim 3, wherein the number of mould parts of said first conveyor is an integral multiple of the number of mould parts of said second conveyor.

References Cited

UNITED STATES PATENTS

| | | | |
|---|---|---|---|
| 2,281,860 | 5/1942 | Renault | 18—4BUX |
| 2,817,875 | 12/1957 | Harris et al. | 18—4B |
| 3,066,351 | 12/1962 | Schriner | 18—4BX |
| 3,298,064 | 1/1967 | Taga | 18—4CX |
| 3,342,251 | 9/1967 | Nagin et al. | 18—4CUX |
| 3,462,795 | 8/1926 | Hermanns | 18—4B |

WILLIAM S. LAWSON, Primary Examiner